(12) United States Patent
Oh

(10) Patent No.: US 8,387,483 B2
(45) Date of Patent: Mar. 5, 2013

(54) STEERING COLUMN FOR VEHICLE AND STEERING APPARATUS FOR VEHICLE HAVING THE SAME

(75) Inventor: Jae-moon Oh, Gongju-si (KR)

(73) Assignee: Mando Corporation, Gyeonggi-Do (KR)

( * ) Notice: Subject to any disclaimer, the term of this patent is extended or adjusted under 35 U.S.C. 154(b) by 301 days.

(21) Appl. No.: 12/817,404

(22) Filed: Jun. 17, 2010

(65) Prior Publication Data

US 2010/0326230 A1 Dec. 30, 2010

(30) Foreign Application Priority Data

Jun. 30, 2009 (KR) .................. 10-2009-0059104

(51) Int. Cl.
 *B62D 1/18* (2006.01)
(52) U.S. Cl. .......................................... 74/493; 280/775
(58) Field of Classification Search ............... 74/493; 280/775
 See application file for complete search history.

(56) References Cited

U.S. PATENT DOCUMENTS

| | | | | |
|---|---|---|---|---|
| 5,176,401 A * | 1/1993 | Chapman | ...... | 280/775 |
| 5,605,351 A * | 2/1997 | Higashino | ...... | 280/775 |
| 6,134,982 A * | 10/2000 | Takabatake | ...... | 74/493 |
| 7,328,917 B2 * | 2/2008 | Sawada et al. | ...... | 280/775 |
| 7,770,488 B2 * | 8/2010 | Kim et al. | ...... | 74/493 |
| 2005/0104353 A1 * | 5/2005 | Ikeda et al. | ...... | 280/775 |
| 2006/0207380 A1 * | 9/2006 | Higashino | ...... | 74/493 |
| 2008/0134827 A1 * | 6/2008 | Jo | ...... | 74/493 |
| 2009/0282945 A1 * | 11/2009 | Streng et al. | ...... | 74/493 |

* cited by examiner

*Primary Examiner* — Justin Krause
(74) *Attorney, Agent, or Firm* — McDermott Will & Emery LLP

(57) ABSTRACT

Disclosed are a steering column for a vehicle and a steering apparatus for a vehicle having the same. According to the present invention, since a coupling position of a tilt bolt is positioned on the central axis of a steering shaft, bending is not caused and an adjustment lever does not hit a driver on the knee at the time of vehicle collision, and the nut opposite to the adjustment lever can be prevented from being loosened at the time of manipulating the adjustment lever.

10 Claims, 4 Drawing Sheets

STEERING COLUMN FOR VEHICLE AND STEERING APPARATUS FOR VEHICLE HAVING THE SAME

BACKGROUND OF THE INVENTION

1. Field of the invention

The present invention relates to a steering column for a vehicle and a steering apparatus for a vehicle having the same. In particular, the present invention relates to a steering column for a vehicle in which a coupling position of a tilt bolt is positioned on the central axis of a steering shaft, so that bending is not caused and an adjustment lever does not hit a driver on the knee at the time of vehicle collision, and a nut opposite to the adjustment lever can be prevented from being loosened at the time of manipulating the adjustment lever.

2. Description of the Prior Art

As generally known in the art, a steering apparatus for a vehicle is an apparatus for allowing a driver to change the traveling direction of the vehicle in accordance with the driver's intention, thereby assisting the driver to freely change the center of rotation of the front wheels of the vehicle so as to make the vehicle travel in a desired direction.

Steering force produced in such a steering apparatus for a vehicle when the driver manipulates the steering wheel will be transferred to a rack and pinion mechanism through a steering shaft, and will finally change the orientation of the opposite front wheels.

In addition, a telescopic function or a tilt function may be additionally provided for such a steering apparatus for the convenience of a driver through a telescopic apparatus or a tilt apparatus, wherein the tilt apparatus serves to adjust the anchoring angle of a steering wheel, and the telescopic apparatus is formed by inserting a hollow tube into another hollow tube in such a manner that they can be extended or retracted in the axial direction. At the time of vehicle collision, the telescopic apparatus may serve to absorb impact energy by allowing the steering shaft and the steering column to be collapsed.

Consequently, a steering apparatus is classified into a telescope-type steering apparatus or a tilt-type steering apparatus according to the above-mentioned functions. If desired, it is possible to add the tilt function to the telescope-type steering apparatus. Through these functions, a driver may adjust the protrusion extent or inclined angle of the steering wheel to be suitable for his/her height or body shape.

FIG. 1 is an exploded perspective view showing a part of a conventional steering column for a vehicle.

As shown in FIG. 1, the conventional steering column for a vehicle includes: an outer tube 100 for receiving a steering shaft 175; an inner tube 170 introduced into the outer tube 100; a lower bracket 165 for fastening the inner tube to a vehicle body; an upper bracket 105 provided at the top side of the outer tube 100, and anchored to the vehicle body; a distance bracket 180 integrally fixed with the outer tube 100, and formed with a telescopic bore 185; at least one tilt bracket 150 united with the upper bracket, and formed with a tilt bore 110; a fixed gear 145 provided on an outer surface of the tilt bracket 150; a movable gear 140 engaged with or disengaged from the fixed gear 145; a tilt bolt 130 extending through the tilt bore 110; a cam 135 engaged with the movable gear 140; a washer 125 and a nut 120 for fastening the cam 130 and a adjustment lever 115; and a gear spring 142 interposed between the movable gear 140 and the fixed gear 145.

Tilt and telescopic operations may be executed by tightening or releasing the adjustment lever 115. If the adjustment lever 115 is tightened, the tilt bracket 150 is tightened, thereby applying compressive force to the outer tube 100 to such an extent that the outer tube 100 and the inner tube 170 come into close contact by the compressive force and no tilt or telescopic operation is executed. Whereas, if the adjustment lever 115 is released, the compressive force applied to the outer tube 100 and the inner tube 170 is removed, so that the tilt or telescopic operation is enabled.

The telescopic operation is completed by changing the position of the tilt bolt 130 along the telescopic bore 185 formed in the distance bracket 180 after the adjustment lever 115 is released, and then tightening the adjustment lever 115.

The tilt operation is completed by changing the position of the tilt bolt 130 along the tilt bore 110 after the adjustment lever 115 is released, and then tightening the adjustment lever 115.

At the condition in which the adjustment lever 115 is locked, the outer tube 110 and the steering shaft 175 are anchored. However, if the adjustment lever 115 is released, the outer tube 100 or the inner tube 170 may be tilted about a tilt center 160 by a cam 135, or the steering column may be axially extended or retracted.

The above-mentioned conventional steering column for a vehicle has problems in that since the coupling position of the tilt bolt is spaced downward from the central axis of the steering shaft, substantial bending may be caused at the time of vehicle collision, and since the adjustment lever is assembled at a position lowered by the coupling position of the tilt bolt, the adjustment lever may hit a driver on the knee at the time of vehicle collision, and a nut opposite to the adjustment lever may be loosened when the adjustment lever is manipulated.

SUMMARY OF THE INVENTION

Accordingly, the present invention has been made to solve the above-mentioned problems occurring in the prior art, and an object of the present invention is to provide a steering column for a vehicle, in which a coupling position of a tilt bolt is positioned on the central axis of a steering shaft so that bending is not caused and an adjustment lever does not hit a driver on the knee at the time of vehicle collision, and a nut opposite to the adjustment lever can be prevented from being loosened at the time of manipulating the adjustment lever.

In order to accomplish this object, there is provided a steering column for a vehicle including: a ring bolt having a pair of fastening parts at the opposite sides thereof, each fastening part having threads formed on a cylindrical member, the central part of the ring bolt is configured so as to allow an outer tube to be inserted through the central part; a tilt bracket with a pair of opposite plates, each of which is formed with a tilt slit opened in an end of the corresponding plate; and a plain nut closely contacted with and supported by an outer surface of the tilt bracket, one side of the plain nut being extended through one of the tilt slits and coupled to one of the fastening parts of the ring bolt.

In accordance with another aspect of the present invention, there is provided a steering apparatus for a vehicle including a steering column within which a steering shaft is housed, and a rack and pinion mechanism coupled with the steering shaft so as to steer the front opposite wheels of the vehicle, wherein the steering column includes: a ring bolt having a pair of fastening parts at the opposite sides thereof, each fastening part having threads formed on a cylindrical member, the central part of the ring bolt is configured so as to allow an outer tube to be inserted through the central part; a tilt bracket with a pair of opposite plates, each of which is formed with a tilt slit opened in an end of the corresponding plate; and a plain nut closely contacted with and supported by an outer surface of the tilt bracket, one side of the plain nut being extended through one of the tilt slits and coupled to one of the fastening parts of the ring bolt.

In accordance with the present invention, since the coupling position of the tilt bolt is positioned on the central axis of the steering column, bending is not caused and an adjustment lever does not hit a driver on the knee at the time of vehicle collision, and a nut opposite to the adjustment lever can be prevented from being loosened when the adjustment lever is manipulated.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
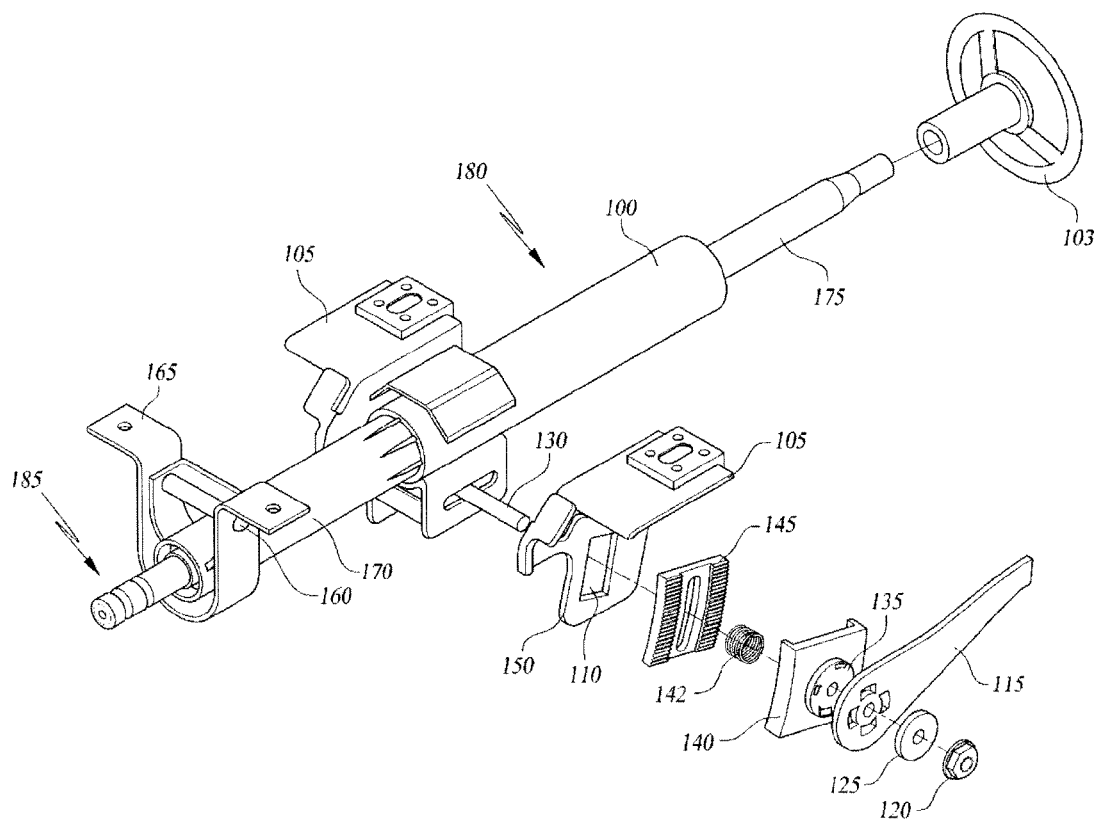
FIG. 1 is an exploded perspective view showing a part of a conventional steering column for a vehicle.

Hereinafter, a preferred embodiment of the present invention will be described with reference to the accompanying drawings. In the following description and drawings, the same reference numerals are used to designate the same or similar components, and so repetition of the description on the same or similar components will be omitted.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, assembled or joined to the second component.

Figure 2:
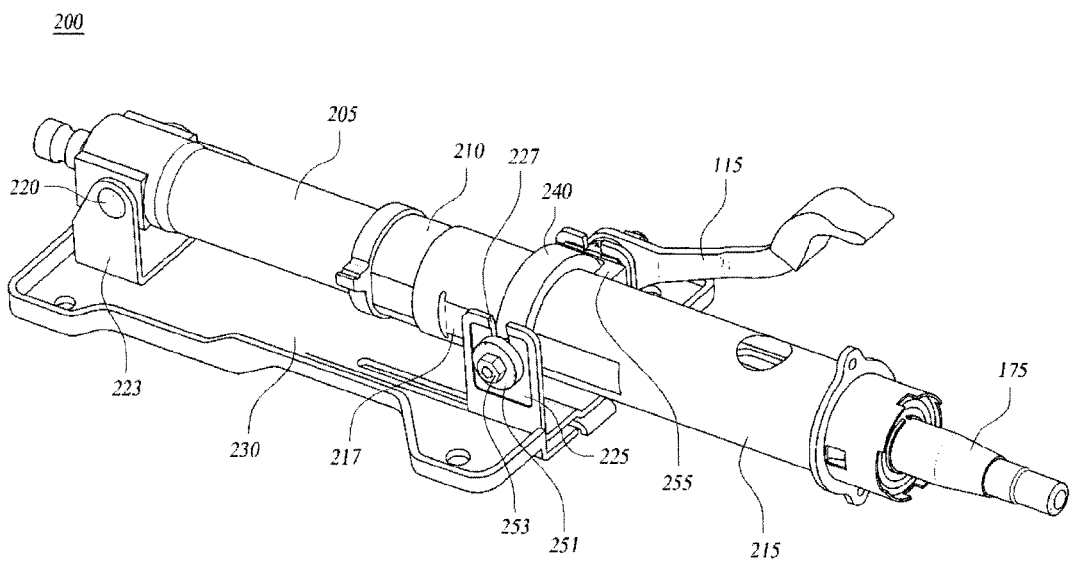
FIG. 2 is a perspective view showing a part of a steering column for a vehicle in accordance with an embodiment of the present invention.
Figure 3:
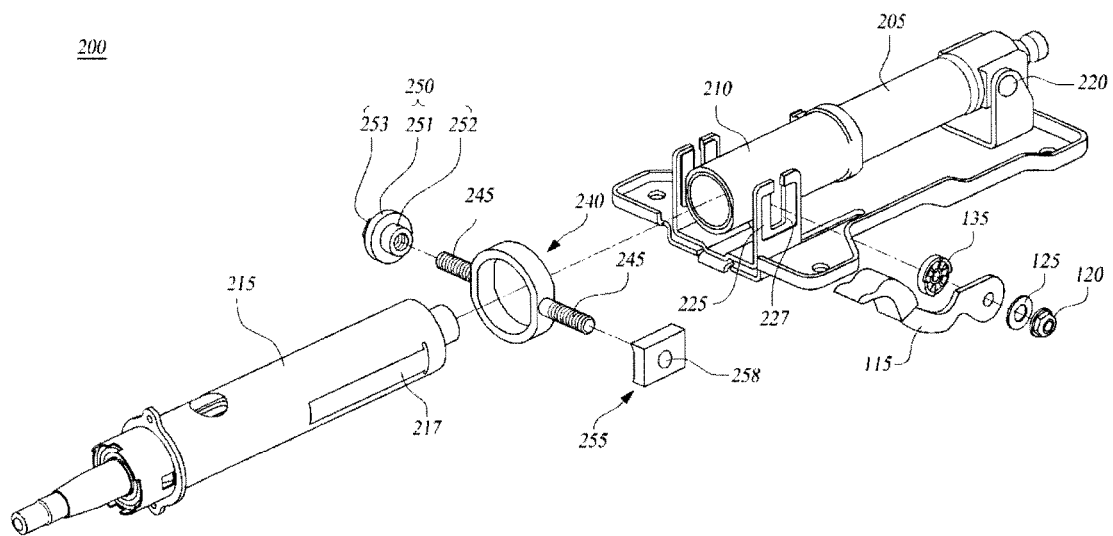
FIG. 3 is an exploded perspective view of the steering column of FIG. 2.
Figure 4:
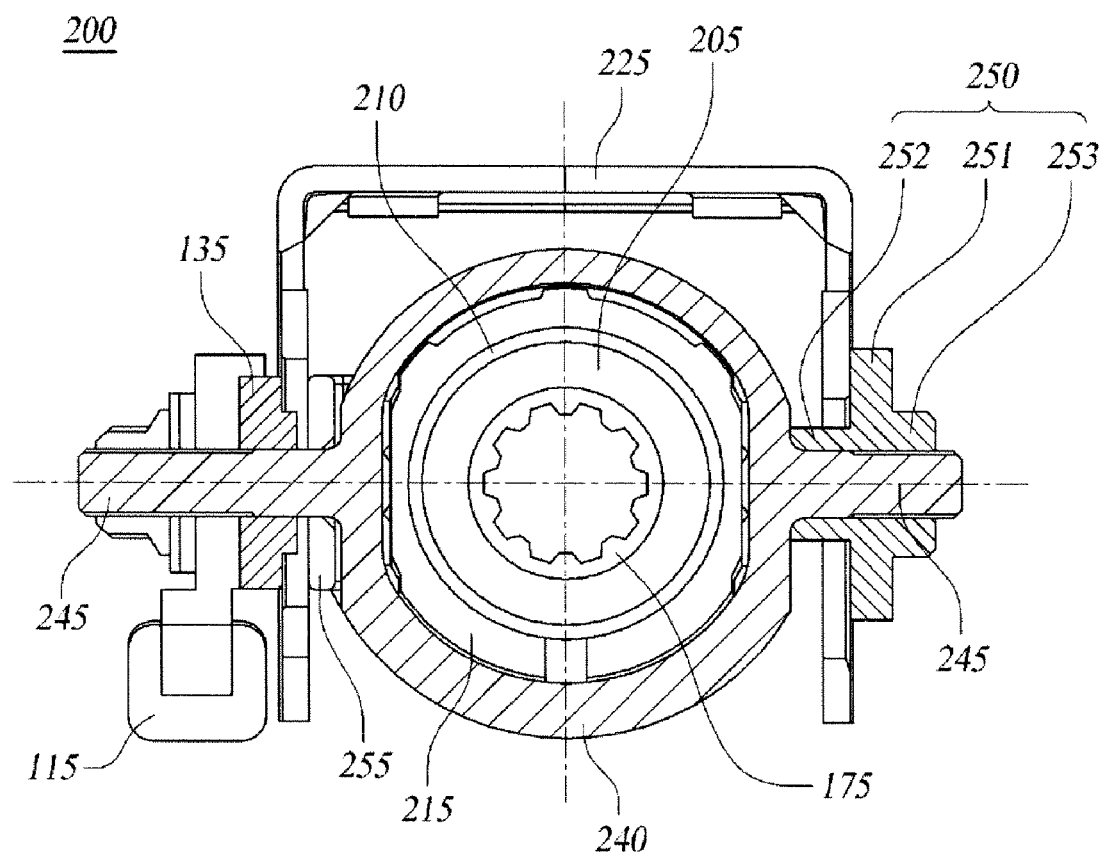
FIG. 4 is a cross-sectional view of the steering column of FIG. 2.

FIG. 2 is a perspective view showing a part of a steering column for a vehicle in accordance with an embodiment of the present invention, FIG. 3 is an exploded perspective view of the steering column of FIG. 2, and FIG. 4 is a cross-sectional view of the steering column of FIG. 2.

As shown in FIGS. 2 and 3, the steering column 200 in accordance with an embodiment of the present invention includes: a ring bolt 240 having a pair of fastening parts 245 provided at opposite sides thereof, respectively, and a central part, each of the fastening parts having a threaded portion formed on outer circumferential surface of a cylindrical member, and an outer tube 215 being adapted to be inserted into the central part of the ring bolt 240; a tilt bracket 225 having a pair of opposite tilt slits 227, each of the tilt slits 227 being formed in a plate to be opened at an end of the plate so that the fastening parts can be engaged in the tilt slits, respectively; and a plain nut 250, which comes into close contact with and is sported by the outer surface of the tilt bracket 225, the plain nut being engaged with one of the fastening parts 245.

The plain nut 250 has a seat part 251 adapted to come into close contact with the outer surface of the tilt bracket 225, and a support part 252 formed on the inner surface of the seat part 251 to extend in the direction of the central axis of the inner surface, the support part 252 being introduced into one of the tilt slits 227 and supported by the outer circumferential surface of the outer tube 215. In addition, the plain nut 250 may further include a nut part 253 at the outer surface of the seat part 251, which extends in the direction of the central axis for the seat part 251, and has threads formed on the inner circumferential surface of the plain nut 250.

At one side of the ring bolt 240, the fastening part 245 and the adjustment lever 115 are engaged with each other, and at the other side of the ring bolt 240, one of fastening parts 245 is fitted in the plain nut 250.

The inventive steering column 200 is characterized in that the ring bolt 240, which performs the function of the conventional tilt bolt, is positioned on the central axis of the steering column, and the plain nut 250, which is engaged with one side of the tilt bracket 225, has a feature for preventing the plain nut 250 from being loosened from the ring bolt 240 to such an extent that torque is released.

In the following description of the present invention, the steering wheel-positioned side will be referred to as the upper side, and the opposite side will be referred to as the lower side for the convenience of description.

There is provided an inner tube 205, which is a hollow cylindrical tube and within which a steering shaft is housed. At the upper end of the inner tube, a telescopic bush 210 is interposed between the inner tube 205 and the outer tube 215 so as to reduce frictional force produced at the time of telescopic operation, and the lower end of the inner tube 205 is coupled to a mounting bracket via a tilt hinge 220. The tilt hinge 220 serves as an axis of rotation at the time of tilt operation.

The telescopic bush 210 is fitted on the upper end of the inner tube 205 and introduced into the outer tube 215, and the outer tube 215 is a hollow cylindrical tube, the lower end of which is adapted to be slid on the outer circumferential surface of the telescopic bush 210 at the time of telescopic operation.

The ring bolt 240 is tightly fitted on the lower side of the outer circumferential surface of the outer tube 215, wherein the ring bolt 240 is coupled to the tilt bracket 225 together with the adjustment lever 115 and the plain nut 250, and a guide block 255 is interposed between the outer tube 215 and the plate of the tilt bracket 225 at the area where the adjustment lever 115 is coupled, so that when the adjustment lever 115 is tightened, compressive force is applied to the plain nut 250 and the guide block 255 by the plate of the tilt bracket 225 restrained between the ring bolt 240 and the adjustment lever 115, whereby the outer tube 215 comes into compressive and close contact with the telescopic bush 210 and the inner tube 205.

The outer tube 215 may be formed with flat mounting faces 217 on the opposite sides in the area where the plain nut 250 and the guide block 255 are engaged with the outer tube 215.

The ring bolt 240 is coupled to the adjustment lever 115 for executing tilt or telescopic operation at one side, and coupled to the plain nut 250 at the other side, wherein the ring bolt 250 has fastening parts 245 at the opposite sides, each fastening part 245 having a threaded portion formed on the circumferential surface of a cylindrical member, and a central area between the opposite sides, the central area being formed in a ring shape so that the outer tube 215 can be introduced through the central area.

In addition, the ring bolt 240 may be coated with a low-friction material on the inner circumferential surface thereof so as to reduce the frictional force with the outer tube 215 which is slid at the time of telescopic operation.

At the side of the tilt bracket 225 opposite to the adjustment lever 115, the plain nut 250 is coupled in such a manner that the plain nut 250 supports the ring bolt 240 while preventing the plain nut 250 and the ring bolt 240 from being released from each other at the side opposite to the adjustment lever 115 at the time of operating the adjustment lever 115.

The plain nut 250 may be generally divided into a seating part 251 and a support part 252, and may further include a nut part 253. The seating part 251 is formed in a flat shape so that it can come into contact with and be anchored to the outer surface of the tilt bracket. The support part 252 and the nut part 253 are integrally formed with the seating part 251 in a hollow shape with threads formed on the inner circumferential surface thereof. One of the fastening parts 245 of the ring bolt 240 is fitted into the hollow part in such a manner that the threads formed on the fastening part are engaged with the threads on the inner circumferential surface.

In addition, the outer circumferential surface 253 is formed with a plurality of flat portions so that a tool can be engaged with the flat portions, whereby it is easy and convenient to assemble the plain nut 250 to the ring bolt 240.

Consequently, since the plain nut 250 is extended through the tilt slits 227 in the tilt bracket 225, and securely coupled to the ring bolt 240, the ring bolt 240 and the plain nut 250 can be prevented from being released from each other.

The guide block 255, through which one of the fastening parts 245 of the ring bolt 240 is extended, is interposed between the outer circumferential surface of the outer tube 215 and one of the opposite plates of the tilt bracket 225. Compressive force for tightening the opposite plates of the tilt bracket 225 is applied to or released from the outer tube 215 by the guide block 255, whereby the tilt or telescopic operation of the steering column 200 can be executed.

The guide block 255 is coated with a low-friction material on the inner surface thereof which is in contact with the outer tube 215, so that frictional force with the outer tube 215 slid at the time of telescopic operation can be reduced.

In addition, a steering apparatus for a vehicle in accordance with another embodiment of the present invention includes a steering column 200 as described in the above-mentioned embodiments of the present invention, and a rack and pinion mechanism coupled to a steering shaft 175 housed within the steering column 200 so as to steer the front opposite wheels of the vehicle. Below, the steering column 200 will not be described further.

According to the present invention with the constructions and shapes as described above, since the coupling position of the tilt bolt is positioned on the central axis of the steering shaft, bending is not caused and the adjustment lever does not hit a driver on the knee at the time of vehicle collision, and it is possible to prevent a nut opposite to the adjustment lever from being loosened at the time of operating the adjustment lever.

Even if it was described in the above that all of the components of an embodiment of the present invention are coupled as a single unit or coupled and operated as a single unit, the present invention is not limited to such an embodiment. That is, within the purpose of the present invention, all of the components may be selectively coupled and operated as one or more units.

In addition, since terms, such as "including," "including," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiment disclosed in the present invention is intended to illustrate the scope of the technical idea of the present invention, and the scope of the present invention is not limited by the embodiment. The scope of the present invention shall be construed on the basis of the accompanying claims, and it shall be construed that all of the technical ideas included within the scope equivalent to the claims belong to the present invention.

What is claimed is:

1. A steering column for a vehicle, comprising:
    a ring bolt having a pair of fastening parts fixedly attached thereto at opposite sides of the ring bolt, each fastening part having threads formed on a cylindrical member, a central part of the ring bolt is configured so as to allow an outer tube to be inserted through the central part;
    a tilt bracket with a pair of opposite plates, each plate having a tilt slit opened in an end of the corresponding plate; and
    a nut configured to be contacted with and supported by an outer surface of the tilt bracket, one side of the nut extending through one of the tilt slits and coupled to one of the fastening parts of the ring bolt.

2. The steering column as claimed in claim 1, wherein a guide block is inserted between an inner surface of the tilt bracket and the outer tube so that when an adjustment lever is tightened, the ring bolt, the outer tube, a telescopic bush, and an inner tube are compressed and come into contact with each other.

3. The steering column as claimed in claim 1, wherein an inner circumferential surface of the ring bolt is coated with a friction reducing material to reduce a frictional force with the outer tube which is slid when a telescopic operation is performed.

4. The steering column as claimed in claim 1, wherein the nut comprises:
    a seating part configured to be in contact with the outer surface of the tilt bracket; and
    a support part extending in the direction of a central axis of the seating part from an inner surface of the seating part, the support part extending through one of the tilt slits and supported by an outer circumferential surface of the outer tube.

5. The steering column as claimed in claim 4, wherein the nut further comprises a nut part extending in the direction of the central axis of the seating part from an outer side of the seating part, the nut part having threads on an inner circumferential surface of the nut part.

6. A steering apparatus for a vehicle comprising a steering column within which a steering shaft is housed, and a rack and pinion mechanism coupled with the steering shaft to steer front opposite wheels of the vehicle, wherein the steering column comprises:

a ring bolt having a pair of fastening parts fixedly attached thereto at opposite sides of the ring bolt, each fastening part having threads formed on a cylindrical member, a central part of the ring bolt is configured so as to allow an outer tube to be inserted through the central part;

a tilt bracket with a pair of opposite plates, each plate having a tilt slit opened in an end of the corresponding plate; and a nut configured to be contacted with and supported by an outer surface of the tilt bracket, one side of the nut extending through one of the tilt slits and coupled to one of the fastening parts of the ring bolt.

7. The steering apparatus as claimed in claim 6, wherein a guide block is inserted between an inner surface of the tilt bracket and the outer tube so that when an adjustment lever is tightened, the ring bolt, the outer tube, a telescopic bush, and an inner tube are compressed and come into contact with each other.

8. The steering apparatus as claimed in claim 6, wherein an inner circumferential surface of the ring bolt is coated with a friction reducing material to reduce a frictional force with the outer tube which is slid when a telescopic operation is performed.

9. The steering apparatus as claimed in claim 6, wherein the nut comprises:

a seating part configured to be in contact with the outer surface of the tilt bracket; and a support part extending in the direction of a central axis of the seating part from an inner surface of the seating part, the support part extending through one of the tilt slits and supported by an outer circumferential surface of the outer tube.

10. The steering apparatus as claimed in claim 9, wherein the nut further comprises a nut part extending in the direction of a central axis of the seating part from the outer side of the seating part, the nut part having threads on an inner circumferential surface of the nut part.

* * * * *